United States Patent [19]

Weissert et al.

[11] Patent Number: 4,503,020

[45] Date of Patent: Mar. 5, 1985

[54] METHOD OF PRODUCING CALCIUM SULFATE SEMIHYDRATE IN CONJUNCTION WITH THE DESULFURIZATION OF FLUE GASES

[75] Inventors: Helmut Weissert, Bochum-Hiltrop; Karl-Rudolf Hegemann, Essen-Bergerhausen, both of Fed. Rep. of Germany

[73] Assignee: Gottfried Bischoff Bau kompl. Gasreinigungs- und Wasserrückkühlanlagen GmbH & Co. Kommanditgesellschaft, Essen, Fed. Rep. of Germany

[21] Appl. No.: 546,486

[22] Filed: Oct. 28, 1983

[30] Foreign Application Priority Data

Oct. 30, 1982 [DE] Fed. Rep. of Germany ....... 3240317

[51] Int. Cl.$^3$ .................. C01B 17/00; C01F 1/00; C01F 11/46
[52] U.S. Cl. .................. 423/242; 423/166; 423/555
[58] Field of Search ............ 423/242 A, 242 R, 555, 423/166; 55/73

[56] References Cited

U.S. PATENT DOCUMENTS

| | | | |
|---|---|---|---|
| 2,080,779 | 5/1937 | Lessing | 423/242 |
| 2,090,142 | 8/1937 | Nonhebel et al. | 423/242 |
| 3,808,321 | 4/1974 | Fukui et al. | 423/166 |
| 4,374,812 | 2/1983 | Atsukawa et al. | 423/242 |

FOREIGN PATENT DOCUMENTS

| | | | |
|---|---|---|---|
| 53-51199 | 5/1978 | Japan | 423/555 |
| 55-113621 | 2/1980 | Japan | 423/555 |
| 56-149322 | 11/1981 | Japan | 423/555 |

*Primary Examiner*—Gregory A. Heller
*Attorney, Agent, or Firm*—Karl F. Ross; Herbert Dubno

[57] ABSTRACT

Calcium sulfate dihydrate in large crystal form is produced by maintaining the circulation of the lime containing scrubbing solution in the desulfurization scrubbing of flue gases from a power plant boiler so that it has a residence time of 5 to 25 hours, preferably 15 hours. The crystals are moved by passing a portion of the recirculation through a thinner in which a sludge containing crystals with a mean particle size of which 90% is in excess of 100 microns is removed. This product can be dewatered and treated with sulfuric acid and steam to convert it to the alpha semihydrate and is free from sulfite.

6 Claims, 1 Drawing Figure

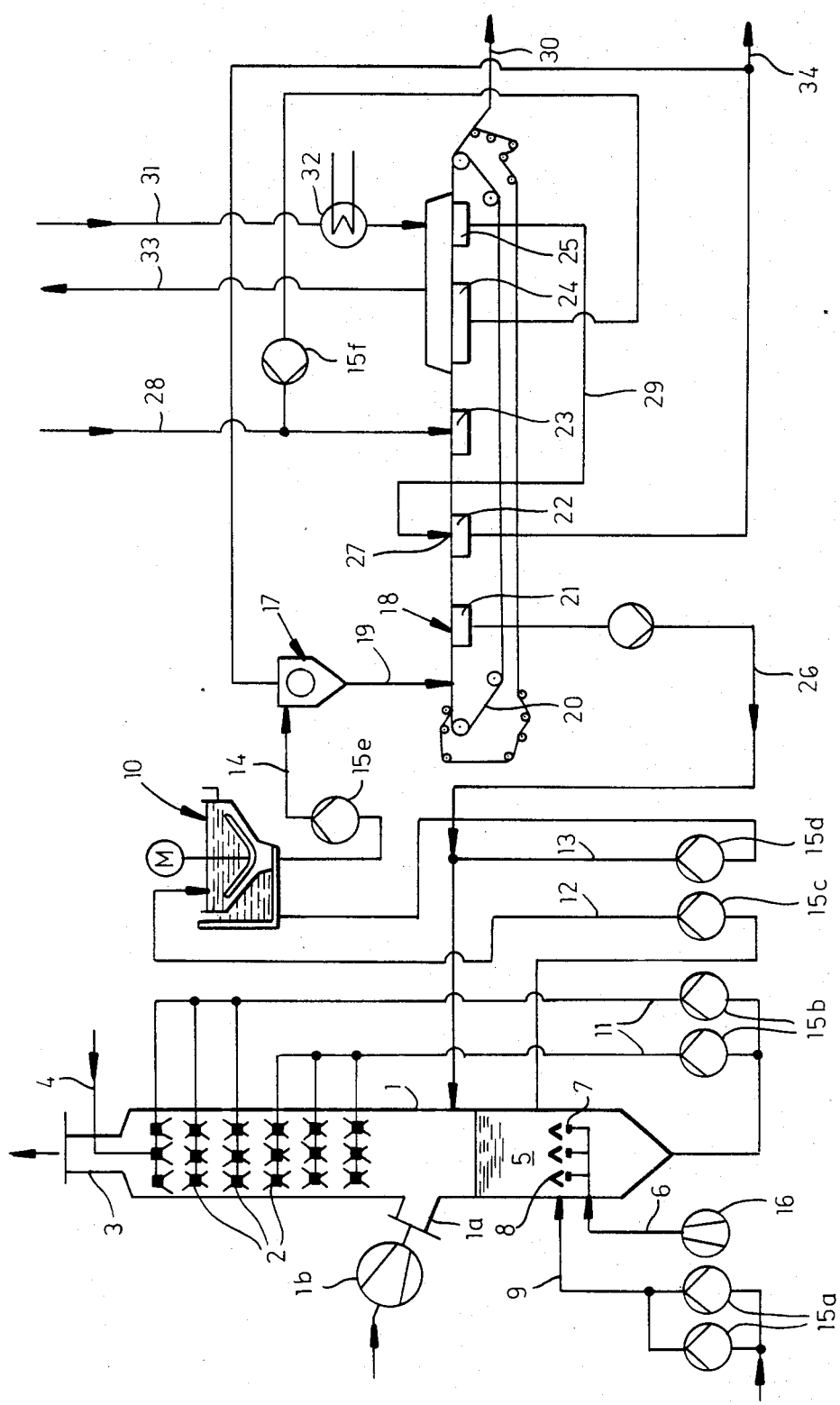

METHOD OF PRODUCING CALCIUM SULFATE SEMIHYDRATE IN CONJUNCTION WITH THE DESULFURIZATION OF FLUE GASES

CROSS REFERENCE TO RELATED APPLICATIONS

The present application is related to the commonly assigned copending applications Ser. No. 402,570 filed 28 July 1982, (now abandoned) Ser. No. 515,919 filed 20 July 1983 and Ser. No. 493,984 filed 12 May 1983. This application is also related to application Ser. No. 405,603 which was filed 5 Aug. 1982 and is jointly owned by the assignee of the present case and another enterprise. That application has reference to a series of other applications concerned directly or indirectly with gas cleaning of which the following may be mentioned: Ser. No. 321,071 of 13 Nov. 1981 (U.S. Pat. No. 4,427,183) and Ser. No. 327,500 of 4 Dec. 1981 (U.S. Pat. No. 4,415,142).

Attention is also directed to a group of commonly owned patents dealing with gas cleaning, namely, U.S. Pat. Nos. 4,375,439, 4,316,727, 4,218,241, 4,145,193, 4,052,042, 4,007,025 and the patents cited in these documents or listed in the files thereof.

FIELD OF THE INVENTION

The present invention relates to a method of producing calcium sulfate dihydrate in conjunction with the desulfurization of flue gases and especially to the transformation of the sulfur oxides of flue gases from power plant combustion chambers into a useful product such as the calcium sulfate dihydrate which can be utilized economically and efficiently or transformed into products useful in construction.

BACKGROUND OF THE INVENTION

From the aforementioned copending applications and the literature generally in the flue gas cleaning arts, it should be apparent that the desulfurization of a flue gas, especially from a fossil-fuel power plant combustion system, may involve the introduction of a calcium compound, generally lime or calcium carbonate so that the sulfur or sulfur compounds will eventually be removed by an absorption of sulfur oxide and/or transformation thereof to calcium sulfate, for example, which can collect in the sludge of the slurry at the sump of the scrubbing tower.

It is known, therefore to desulfurize such flue gases by scrubbing them in a scrubbing tower with a lime or calcium carbonate-containing scrubbing suspension and indeed it is also known to introduce oxygen into the tower in the form of air, technical grade oxygen or oxygen enriched air to maximize the recovery of the calcium sulfate in the sump of the tower.

The sump product is separated into the recovered solids and a scrubbing suspension which is recycled and at least a portion of the sump product can be delivered to a thickener from which a calcium sulfate dihydrate sludge or slurry is withdrawn.

For convenience, the term "lime" will be used herein to refer to any sulfur-binding calcium compound, including calcium oxide, calcium hydroxide and calcium carbonate and any compounds which may tend to form these sulfur-binding compounds or which can yield a calcium sulfate dihydrate upon reaction with flue gas in a scrubbing solution.

In the conventional processes of the type described, the calcium-sulfur compound which predominates is the calcium sulfate dihydrate although some not insignificant amount of calcium sulfite may be present therein.

The presence of even small quantities of calcium sulfite in the sludge or slurry creates problems especially when the sludge or slurry is to be used in the production of plasterboard or like gypsum building materials in which the gypsum may be laminated with cardboard or the like.

It has, therefore, been proposed to transform the calcium sulfate dihydrate sludge to a gypsum alpha semihydrate or hemihydrate, a product which can be utilized without difficulty in the production of plasterboard.

When the calcium sulfate dihydrate was to be used directly in the production of plasterboard, it required calcination and generally the quality of the resulting product did not suffice. It appears that the particle size or granulation of the individual calcium sulfate dihydrate was such that dewatering and/or drying was made difficult and the relevant chemical reaction could not be effected reliably. Attempts were made to overcome these disadvantages by varying the processing parameters without significant success and indeed success can hardly have been expected because the development of a narrow range of effective processing parameters including treatment times, temperatures, flow rates and the like could not be expected to be meaningful because of the intrinsic variation in the calcium sulfate products which were treated.

OBJECTS OF THE INVENTION

It is the principal object of the present invention to provide an improved method of treating flue gases and of processing the sump product obtained by the lime scrubbing of the flue gases so that the calcium sulfate dihydrate sludge is practically free from calcium sulfite and, in addition, consists of calcium sulfate dihydrate crystals whose particle size is such that the product can be treated with ease to produce a usable structural material without the difficulties hitherto encountered.

Another oject of this invention is to provide a method of processing the sump product of a scrubber of the type described which will enable complete transformation of the calcium sulfate dihydrate into the sulfate semihydrate without the disadvantages described previously.

SUMMARY OF THE INVENTION

We have discovered a method of processing the sump product of a flue gas scrubber operating with lime and producing calcium sulfate dihydrate which can avoid all of the disadvantages enumerated previously and especially can result in calcium sulfate dihydrate crystals of a large uniform particle size or grain size such that any necessary fuel treatments and chemical reactions can be effected relatively and definitively, i.e. within predetermined time parameters, under conditions in which the product is free from calcium sulfite so that the calcium sulfate dihydrate residue sludge or slurry can be easily and conveniently treated with sulfuric acid under definite conditions and thereby transformed completely into the alpha semihydrate and further so that residual sulfuric acid can readily be washed from the alpha semihydrate which is thus produced.

We have found, more particularly, that it is important to circulate the scrubbing liquid in a circulation path including the sump of a scrubbing column, the scrubbing column and the thickener with a mean residence time of 5 to 25 hours, preferably with a mean residence time in excess of 15 hours, to extract from the thickener calcium sulfate dihydrate crystals having a particle size distribution in which at least 90% by weight or volume have a particle size greater than 100 microns, and to dewater the extracted calcium sulfate dihydrate sludge consisting of the dihydrate crystals of the latter particle size distribution.

It is indeed surprising that, in this manner, it is possible to ensure that the calcium sulfate dihydrate solid product thus obtained is extremely homogeneous and predominantly consists of crystals having a large grain size which contributes an extraordinary improvement in the ability to dewater and wash the product and treat it with sulfuric acid. This enables the calcium sulfate dihydrate to be washed with a minimum amount of water free from chloride.

Equally surprising is the fact that the crystal product which is obtained after dewatering can be utilized directly in the production of plasterboard following calcination without any of the difficulties hitherto encountered and discussed previously.

The large crystals have a reduced specific surface area so that drying is facilitated, e.g. by power plant flue gases with a minimum and unobjectionable amount of chloride being trapped from the flue gases in the dry product.

Perhaps the most surprising advantage is the ability to treat the dewatered calcium sulfate dihydrate at a temperature of less than 100° C. with sulfuric acid to transform it completely to the alpha semihydrate which can be washed readily with water. In the treatment with sulfuric acid, a temperature of 70° C. to 80° C. is preferred.

According to a feature of the invention, especially large calcium sulfate dihydrated crystals can be obtained by maintaining the scrubbing water suspension during the circulation at a temperature of 45° C. to 50° C. The dewatering can be carried out readily utilizing various dewatering installations. An advantage has been found in utilizing a hydrocyclone for the dewatering since the hydrocyclone also effects a degree of calcification to ensure that the desired particle size of crystals will be recovered. Indeed, the particle size is sufficiently large to enable dewatering by a hydrocyclone.

The dewatered calcium sulfate dihydrate sludge is practically free from the conventional slurry character and can be treated without predrying with the sulfuric acid to convert to the alpha semihydrate gypsum.

In a preferred mode of the invention the transformation of the calcium sulfate dihydrate to the gypsum alpha semihydrate is effected at a temperature of 80° to 100° C. with heat being supplied by steam and the temperature being maintained by the controlled addition of steam.

What is also surprising is the fact that the especially large crystals are useful for the production of plasterboard, gypsum-concrete board, other gypsum compositions or slabs and in the production of the alpha hemihydrate.

Operating parameters for the processing of the large particle size cyrstals can be determined empirically with ease and the product can be treated utilizing the previously determined parameters reproducibly. Since calcium sulfite is not present, the problems hitherto encountered with the calcium sulfite are eliminated.

BRIEF DESCRIPTION OF THE DRAWING

The above and other objects, features and advantages of the present invention will become more readily apparent from the following description, reference being made to the sole FIGURE of the accompanying drawing which represents a flow diagram of the process of the invention.

SPECIFIC DESCRIPTION

The apparatus shown in the drawing comprises the usual scrubber 1 for the desulfurization of a flue gas entering the column via an inlet 1a and forced through the column by a blower 1b from the flue of a combustion chamber of a fossil-fueled boiler producing steam for driving the turbines of a power plant. The construction of the column can be that described in the copending applications Ser. No. 515,919 and Ser. No. 493,984.

Within this column, the flue gases are treated with a scrubbing suspension of lime in the scrubbing water, this suspension being dispersed in the flue gas by sprayheads or nozzles inducing turbulence and vortex flow of the spray and the flue gas to bring about intimate contact of the flue gas with the scrubbing suspension. Preferably, as represented by the tiers of the scrubbing nozzles, the scrubbing can be carried out in a number of stages in a cascade as the flue gas flows upwardly to be discharged at an outlet 3. Further treatment of the flue gas from this outlet before it enters the stack is, of course, possible.

Make-up water can be added via the line 4.

The scrubbing column 1 also has a sump 5 in which the scrubbing suspension, having absorbed sulfur dioxides from the gas stream, can collect.

As described in the last mentioned copending applications, oxygen in the form of air can be introduced via line 16 through nozzles 7 which are disposed below distribution caps 8. As the oxygen reacts with the sump solution and suspension, to oxidize any sulfite to sulfate, the suspension passes below these distribution caps to the bottom of the sump.

The lime can be added in the form of milk of lime, i.e. a calcium hydroxide suspension in water, via line 9 utilizing the pumps 15a.

Part of the scrubbing suspension is withdrawn from the bottom of the sump by the circulating pumps 15b recycled to the nozzles 2. The recycling lines are represented at 11.

At least part of the scrubbing liquid is, however, withdrawn by pump 15c from the sump 5 and delivered to a thickener 10 from which the supernatant liquid is returned by a pump 15d to the scrubbing column.

Thus the scrubbing liquid solution at least in part includes a thickener which is connected in the circulation path by lines 12 and 13.

Partially dewatered calcium sulfate dihydrate sludge is withdrawn from the thickener via a pump 15e and a line 14.

A blower 16 serves to feed oxygen in the form of air or oxygen enriched air to the scrubbing column.

It is important and indeed vital for the purposes of the invention that the recirculation of the scrubbing suspension be such that the scrubbing suspension is circulated through the column with a mean residence time of 5 to 25 hours and preferably more than 15 hours.

This means that only a small proportion of the scrubbing suspension is delivered to the thickener 10 and has its slurry component removed from the recirculation.

The thickener 10 is operated so that the solid phase extracted in the slurry in line 14 has a mean crystal particle size such that over 90% of the solid has a particle size above 100 microns.

This sludge is delivered by line 14 to a hydrocyclone 17 in which it is further dewatered and the dewatered sludge can be subjected to further treatment or, in many cases, utilized directly in the fabrication of building materials in which a wet calcium sulfate dihydrate of large crystal size may be suitable.

In the embodiment illustrated the dewatered calcium sulfate dihydrate sludge is deposited upon a vacuum belt-screen filter 18 and passed over the treatment stations 21 through 25 on the screen belt 20 so that residual water can be vacuum drawn from the crystals at the suction box 21 and returned via line 26 to the scrubber. At a second suction box 22 the crystals are washed with a washing liquid which may be drawn from a subsequent stage 25. The washing liquid is introduced via line 31 and may be heated by a heat exchanger 32.

At a third suction box or station 23 the crystals may be treated with sulfuric acid supplied by line 28 and excess sulfuric acid can be drawn off in suction box 24 via the pump 15f after the crystals have been completely reacted to the alpha semihydrate of calcium sulfate and in this region and in the region or stage 23, the crystals can also be subjected to contact with steam for temperature control. The steam is drawn off at 33.

At the final stage 25, the crystals are washed with water and the recovered washwater is supplied to the stage 22 as previously described. Waste water is discharged at 34 and the calcium sulfate alpha semihydrate recovered at 30 can be used directly in a structural composition as is well known from the earlier applications mentioned above and dealing with the recovery of calcium sulfate.

We claim:

1. A method of producing calcium sulfate alpha semihydrate in conjunction with the desulfurization of a flue gas comprising the steps of:

(a) treating a flue gas containing sulfur compounds in a scrubbing column with a lime-containing aqueous scrubbing suspension and collecting said suspension in a sump of said column whereby said suspension includes sulfite;
    (b) introducing oxygen in the form of air or oxygen enriched air directly into said column to oxidize sulfite to sulfate and form calcium sulfate dihydrate in the suspension in said sump;
    (c) recirculating said suspension from said sump through said column so that said suspension has a mean residence time in such recirculation of substantially 5 to 25 hours;
    (d) maintaining the temperature of the recirculated suspension during the recirculation thereof at substantially 45° to 50° C.;
    (e) during such recirculation, feeding a portion of the recirculated suspension to a thickener and recovering from said thickener a sludge containing calcium sulfate dihydrate crystals of a particle size distribution such that at least 90% has a particle size about 100 microns;
    (f) dewatering the resulting sludge;
    (g) treating the dewatered calcium sulfate dihydrate from step (f) with sulfuric acid at a temperature of at most 100° C. to convert it to calcium sulfate alpha semihydrate; and
    (h) washing the alpha semihydrate with water.

2. The method defined in claim 1 wherein said residence time is greater than 15 hours.

3. The method defined in claim 1 wherein said temperature in step (g) is substantially 70° to 80° C.

4. The method defined in claim 1 wherein said sludge is dewatered in step (f) in a hydrocyclone.

5. The method defined in claim 2 wherein the sludge after dewatering in step (f) is subjected to treatment with steam to maintain its temperature between substantially 80° to 100° C. prior to step (g).

6. The method defined in claim 5 wherein the dewatered sludge is treated with steam in a layer on a moving surface.

* * * * *